Aug. 3, 1965   C. I. LIEN ETAL   3,199,009
STEPPER MOTOR SERVO AMPLIFIER
Filed Dec. 12, 1962

INVENTORS
CHARLES I. LIEN
BENJAMIN STRUNK

BY Roland Plothe
ATTORNEY

United States Patent Office 3,199,009
Patented Aug. 3, 1965

3,199,009
STEPPER MOTOR SERVO AMPLIFIER
Charles I. Lien, New York, N.Y., and Benjamin Strunk, Clifton, N.J., assignors to The Bendix Corporation, Teterboro, N.J., a corporation of Delaware
Filed Dec. 12, 1962, Ser. No. 244,193
14 Claims. (Cl. 318—138)

The invention relates generally to stepper motor drive circuits and more particularly to a stepper motor servo amplifier.

Heretofore, servo control loops have included two phase servo motors which introduce overshoot, correctable only by adding large amounts of damping and hence decreasing the speed of response. It is advantageous to use a stepper motor having a fast response with no overshoot. Formerly, the stepper motor was controlled by a digital computer which was large and expensive. The present invention is a stepper motor servo amplifier that directly controls the stepper motor from an analog signal and does away with the digital computer.

An object of the invention is to provide a novel amplifier adapted to drive a digital stepper motor in accordance with an analog error signal.

Another object of the invention is to provide a novel digital stepper motor amplifier that reduces the power applied to the stepper motor during standby to zero.

Another object of the invention is to provide a novel stepper motor servo amplifier adapted to operate from either a double ended D.C. input or a single ended D.C. input.

Another object of the invention is to provide a novel stepper motor servo amplifier providing accuracies heretofore unavailable, and thus permit the inclusion of a stepper motor in a high accuracy servo loop.

The invention contemplates a circuit for controlling a stepper motor in accordance with an analog signal, the stepper motor having first terminal means for receiving power and second terminal means for receiving a signal which controls the direction of rotation, trigger means adapted to receive the analog signal and provide a first output signal to the second terminal means in accordance with the size of the analog signal, and provide power output to the first terminal means of the stepper motor when the analog signal exceeds a predetermined amplitude range. The invention also includes an adapter for receiving a floating D.C. analog input from a double ended source.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
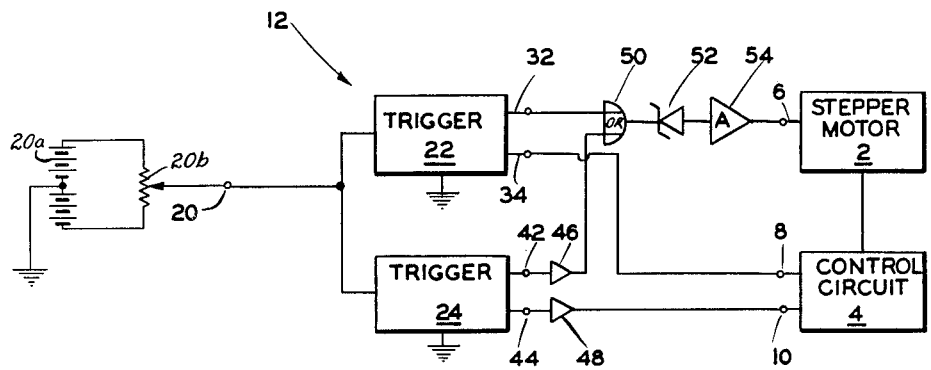
FIGURE 1 is a schematic drawing of an amplifier constructed in accordance with the invention, driving a digital stepper motor.

Referring to the drawing of FIGURE 1, there is shown a stepper motor 2, and a control circuit 4 for controlling the direction of rotation of the motor. Stepper motor 2 has a power terminal 6, and circuit 4 has two control terminals 8 and 10. When one signal on terminal 8 or 10 is high, and the other is low, stepper motor 2 is caused to rotate in one direction, and when the high and low signals are reversed, the stepper motor rotates in the opposite direction. When both signals are high, there is no rotation of the motor. A control circuit of the kind that may be used for circuit 4 is shown and described in Lasch and Strunk, "Reversible Silicon Control Rectifier Ring Counter for Stepper Motor Drive," U.S. application Serial No. 244,218, filed December 12, 1962, assigned to the same assignee as the present invention. If such a circuit is used, then terminals 8 and 10 may be used as the source of forward steering potential 44 and the source of reverse steering potential 45 in the above application and terminal 6 may be connected to the positive terminal in place of generator 14 in the above application.

A stepper motor servo amplifier 12 constructed in accordance with the invention, drives both motor 2 and circuit 4 in accordance with a slowly varying D.C. analog signal applied at its input 20. The signal may be provided by a battery 20a grounded at its center point and a potentiometer 20b connected across the battery. Amplifier 12 is adjustable to drive stepper motor 2 in one direction when the input signals exceed a predetermined amplitude, e.g. +2 volts; and to drive the stepper motor in the opposite direction when the input signal is less than a second predetermined amplitude, e.g. −1 volt.

The input signal is applied to two grounded trigger circuits 22 and 24. Circuit 22, when in an untriggered condition, i.e. when the input signal is less than +2 volts, provides a low output, for example, of +2 volts at an output terminal 32, and a high output, for example, of +12 volts on terminal 34. Circuit 22, when triggered, i.e. when the input signal exceeds +2 volts, reverses the high and low potentials on outputs 32 and 34.

Trigger circuit 24, when untriggered, i.e. for an output signal greater than −1 volt, has a low output on terminal 42 that is, for example, −2 volts, and a high output on terminal 44 that is, for example, −12 volts. When the input signal is less than −1 volt, circuit 24 is triggered and the outputs are reversed providing −12 volts on output 42 and −2 volts on output 44. The outputs on terminals 42 and 44 are applied to inverters 46 and 48, respectively, which change the sign of the signals but maintain their amplitude.

When the input signal at terminal 20 is in the standby or nonactivating range of −1 volt to +2 volts, trigger circuits 22 and 24 are quiescent or untriggered and a low, +2 volt signal is applied from both outputs 32 and 42 (via inverter 46) through an OR gate 50 to a zener diode 52 which has a breakdown voltage greater than two volts and thus blocks the signal from passing to an amplifier 54, which is connected to power terminal 6 of stepper motor 2. Thus, during standby, no power is applied to stepper motor 2. Also during standby, outputs at terminals 34 and 44 from trigger circuits 22 and 24 are both high, and +12 volts is applied to both control terminals 8 and 10 of control circuit 4, which in turn does not provide any rotation control signal to stepper motor 2.

When the signal, at input 20 s less than −1 volt, trigger circuit 24 changes state providing a high on output 42 and a low on output 44. Inverter 46 provides a high +12 volt signal through OR gate 50, which signal causes zener diode 52 to break down and pass a signal to energize amplifier 54, which applies power to stepper motor 2. Triggered circuit 24 provides a low output −2 volts on terminal 44 which is inverted by inverter 48 to provide a low +2 volts to control terminal 10, which in turn energizes the control 4 to cause the stepper motor to rotate in a predetermined direction. When the input signal at terminal 20 rises to and exceeds −1 volt, trigger circuit 24 returns to its quiescent state and in turn withdraws both power from the stepper motor terminal 6 and the direction rotation signal from terminal 10.

When the input signal exceeds +2 volts, trigger circuit 22 changes state providing a high or +12 volt signal on terminal 32, which passes through OR gate 50, breaks down zener diode 52, turns on amplifier 54, which provides power to stepper motor 2. Trigger circuit 22 simultaneously provides a low +2 volt signal to terminal 8 of control circuit 4 which causes stepper motor 2 to rotate in the opposite direction. When the input signal falls below +2 volts, trigger circuit 22 returns to its quiescent state and the output on conductor 32 is low and the output on conductor 34 is high, withdrawing power from terminal 6 and rotation control signal from terminal 8.

The circuit of the invention has just been described operating at trigger level of +2 and −1 volt. The circuit may be made to operate for any predetermined positive and negative trigger level by adjusting the trigger levels of circuits 22 and 24. The trigger levels will be equal or different.

The circuit of the invention may be made to operate at trigger levels of the same polarity, in which case, the trigger circuits 22 and 24 would be of the same polarity type and the inverters 46 and 48 would be omitted.

The trigger circuit of blocks 22 and 24 may be Schmidt Triggers or any other convenient or conventional type of trigger circuits. The Schmidt Trigger circuits provide a double output as shown in the figure. A single output trigger level circuit, such as a tunnel diode crossover level detector may be used with an inverter circuit branched off to drive either the OR gate or the counter. A tunnel diode crossover level detector is shown and described in Carrozza and Nashelsky, U.S. application Ser. No. 173,720, filed February 16, 1962 and assigned to the same assignee as the present application.

Amplifier 12 is shown triggered by a single ended input applied to terminal 20. In certain application, it is necessary to use a double ended input, characterized by a floating slowly time varying D.C. signal.

Figure 2:
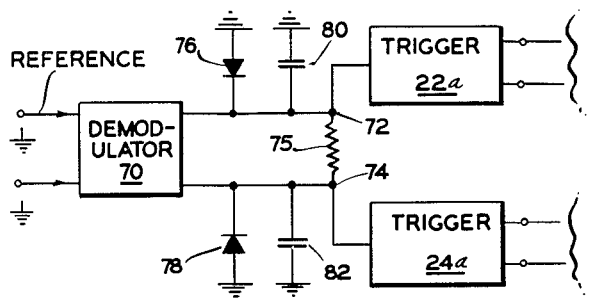
FIGURE 2 is a schematic drawing of an alternative embodiment of the invention.

Such a double ended signal is provided, for example, from a demodulator 70 shown in FIGURE 2, of the type that receives a phase displaced sinusoidal signal and a reference sinusoidal signal, and provides across a resistor 75, a floating full wave, rectified output of positive ½ sinusoids when the signals are in phase, and a full wave rectified output of negative ½ sinusoids when the signals are out of phase. The amplitude of the rectified signal is proportional to the amplitude of the phase displaced signal. A demodulator of this kind is well known and typical demodulators are shown and described in Chestnut and Mayer, Servomechanisms and Regulating System Design, Wiley, (1955), p. 178 and ff. Terminals 72 and 74 of resistor 75 are connected to ground through back-biased diodes 76 and 78, respectively. For a positive rectified output, diode 78 clamps terminal 74 to ground potential and for a negative rectified output, diode 76 clamps terminal 72 to ground potential. Capacitors 80 and 82 connected in parallel with diodes 76 and 78 help filter the full wave rectified sinusoids and also provide quadrature rejection when used with electromechanical type inputs. Thus, for a positive rectified signal, terminal 74 is at ground potential, and terminal 72 has a positive signal; and for a negative rectified signal, terminal 72 is at ground potential and terminal 74 has a positive signal. Terminals 72 and 74 are connected respectively to two trigger circuits 22a and 24a, analogous to circuits 22 and 24 of FIGURE 1. However, both 22a and 24a are of a type to be triggered at a predetermined positive amplitude. The balance of the amplifier circuit is the same as described above.

Features of the invention include an amplifier capable of driving a digital stepper motor from an analog signal. The analog signal may be a single ended D.C. signal or a floating ended D.C. signal. By the use of a demodulator, a phase displaced alternating signal may be used to drive the amplifier. Other type demodulators or transducers may be used to drive the amplifier from other types of analog input signal. The amplifier of the invention controls both the direction of rotation of the stepper motor and the power applied to the stepper motor, and what is particularly important, the amplifier provides no power to the motor during standby.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for controlling a stepper motor in accordance with an analog signal, the stepper motor having first terminal means for receiving power and second terminal means for receiving a signal which controls the direction of rotation, comprising trigger means receiving the analog signal and providing a control signal to the second terminal means in accordance with the polarity of the analog signal when the analog signal exceeds a predetermined amplitude, and providing power to the first terminal of the stepper motor when the analog signal exceeds a predetermined amplitude range.

2. A circuit for controlling a stepper motor in accordance with a D.C. analog signal, the stepper motor having first terminal means for receiving power and second terminal means for receiving a signal controlling the direction of rotation, comprising trigger means receiving the D.C. analog signal and providing a control signal to the second terminal means of the stepper motor in accordance with the sense of the D.C. analog signal and providing power to the first terminal means of the stepper motor when the analog signal exceeds a predetermined amplitude.

3. A device for driving a stepper motor when an applied D.C. analog signal exceeds a predetermined range, comprising a pair of trigger circuits connected to receive the signal, one circuit being triggered when the signal exceeds one limit of the range, and the other being triggered when the D.C. signal exceeds the other limit of the range, both trigger circuits providing a first level output signal when in an untriggered state and a second level output signal when in a triggered state, power amplifier means connecting a source of potential to the stepper motor and connected to the trigger circuit and controlled by the output level signal therefrom for providing power to the stepper motor when either circuit is triggered and the second level output signal is applied thereto, a direction rotation control network connected to the trigger circuits for receiving the outputs therefrom to rotate the stepper motor in one direction when a second level output signal is received from one trigger circuit and in the other direction when a second level output signal is received from the other trigger circuit.

4. In a system of the kind having a stepper motor with a terminal for receiving power, and a control circuit connected to the stepper motor with a pair of terminals for receiving control signals for controlling the direction of rotation of the stepper motor, the improvement comprising a pair of bi-level trigger circuits receiving a D.C. analog signal and triggered thereby when the signal reaches first and second predetermined amplitude levels, each trigger circuit having an output terminal and providing thereat a first level output signal when in an untriggered state and a second level output signal when in a triggered state, a zener diode connected to the output terminals for passing one level output signal and blocking the other level output signal, power amplifier means connecting the zener diode to the stepper motor terminal and controlled by the passed signals to provide power to the stepper motor terminal when a signal is passed from the zener diode, and conducting means connecting trigger circuit output terminals to the control terminals of the control circuit for applying the level output signal thereto to control the direction of rotation of the stepper motor.

5. In a system of the kind having a stepper motor with terminal means for receiving power, and a control circuit connected to the stepper motor with a pair of terminals for receiving control signals for controlling the direction of rotation of the stepper motor, the improvement comprising a pair of bi-level trigger circuits receiving a D.C. analog signal, to be triggered thereby when the signal reaches first and second predetermined amplitude levels, each trigger circuit having a first output terminal and providing thereat a first level output signal when in an untriggered state and a second level output signal when in a triggered state, and each trigger circuit also having a converse output terminal for providing thereat output signals which are the converse of the signals at the first output terminal, a zener diode connected to the first output terminals of both trigger circuits for passing one level output signal and blocking the other level output signal, power amplifier means connected to the zener diode and to the stepper motor power terminal and controlled by the passed signals to provide power to the stepper motor terminal when a signal is passed, and conducting means connecting the converse output terminals of the trigger circuits to the control terminal of the control circuits for controlling the direction of rotation of the stepper motor.

6. A circuit comprising
   (a) a pair of electronic trigger devices both receiving a D.C. analog signal and each adapted to be triggered thereby at a different predetermined amplitude of different polarity, each trigger device having a first output terminal and providing thereat a first level output signal when in an untriggered state and a second level output signal when in a triggered state and each trigger device also having a converse output terminal for providing thereat output signals which are the converse of the signals at the first output terminals,
   (b) inverter means connected to the output terminal and converse output terminal of one trigger device,
   (c) an OR gate connected to the first output terminal of the one trigger device and to the first output terminal through the inverter means to the other trigger device for receiving the output signals therefrom,
   (d) a zener diode connected to the OR gate for passing a signal of one level and blocking the signal of the other level from the trigger device,
   (e) a power amplifier connected to a zener diode for receiving the passed signal therefrom to provide power to a stepper motor only when the passed signal is received,
   (f) conducting means connecting the converse output terminal of one trigger device, and the converse output terminal, via the inverter from the other trigger device to a control circuit connected to the stepper motor, for controlling the direction of rotation of the stepper motor in accordance with the received converse signals.

7. A control circuit adapted to receive a slowly varying D.C. signal floating across a pair of input terminals, comprising
   (a) a resistor connecting the input terminals,
   (b) diodes back-biased from each terminal to ground potential for clamping alternative terminals to ground and thus referencing the signal to ground in accordance with the signal,
   (c) a pair of trigger devices connected to opposite ends of the resistor for receiving the D.C. signal referenced to ground and each adapted to be triggered thereby at a predetermined amplitude.

8. A detector circuit comprising in combination:
   (a) a demodulator adapted to receive a fixed phase reference signal and a phase displaced analog signal with the phase displacement proportional to the analog quantity and provide a D.C. signal whose amplitude is proportional to the amount of phase displacement,
   (b) bi-level trigger circuit means connected to the demodulator to receive the D.C. signal therefrom providing a first level output signal when the D.C. signal is outside a predetermined range, and a second level output signal when the D.C. signal is inside a predetermined range,
   (c) a zener diode connected to the trigger circuit means to receive the output signal therefrom to block the second level output signal and to pass the first level output signal, and
   (d) a power amplifier connecting the zener diode for receiving the passed signal therefrom to provide power to a utilization device only when a passed signal is received.

9. A detector circuit comprising in combination
   (a) a demodulator adapted to receive a fixed phase reference signal and a phase displaced analog signal having a phase displacement proportional to the analog quantity to provide a D.C. signal whose amplitude is proportional to the amount of phase displacement and whose polarity is proportional to the in or out phase relationship between the received signals,
   (b) bi-level trigger means connected to the demodulator to receive the D.C. signal therefrom and provide a first level output signal when the D.C. signal is outside a predetermined range, and a second level output signal when the D.C. signal is within the predetermined range,
   (c) a zener diode connected to receive the output signal from the circuit to block the second level signal and to pass the first level output signal, and
   (d) a power amplifier connected to the zener diode for receiving the passed signal therefrom and to provide power to a utilization device only when the passed signal is received.

10. The combination defined by claim 9 including a double ended output demodulator of a type which provides a floating D.C. signal across a pair of terminals, a resistor connected across the terminals, diodes back-biased from each terminal to ground potential for clamping alternative terminals to ground potential and thus referencing the signal to ground potential in accordance with the signal.

11. The combination defined by claim 10 including capacitors connected in parallel with each diode for filtering the output signal and providing quadrature rejection.

12. The combination defined by claim 10 in which the bi-level trigger circuit means includes a pair of electronic trigger devices having their inputs connected at opposite ends of the resistor and adjusted to be triggered at the limits of the predetermined range.

13. The combination defined by claim 12 including a stepper motor having a power input terminal connected to the power amplifier and a control circuit connected to the stepper motor for controlling the direction of rotation of the motor in accordance with signals received at a pair of control terminals, and the electronic trigger devices providing converse second level and first level outputs, and conducting means connecting the trigger devices to the control circuit for applying the converse signals thereto.

14. A circuit comprising
   (a) a pair of Schmidt triggers receiving a D.C. analog signal and triggered thereby at different predetermined amplitudes of different polarity, each Schmidt trigger having a first output terminal and providing thereat a first level output signal when in an untriggered state and a second level output signal when in a triggered state and each Schmidt trigger also having a converse output terminal for providing thereat output signals which are the converse of the signals at the first output terminal,
   (b) inverter means connected to the output terminal and converse output terminal of one trigger circuit,
   (c) an OR gate connected to the first output terminal of the one trigger circuit and to the first output terminal through the inverter means to the other trigger circuit for receiving the output signals therefrom, (d) a zener diode connected to the OR gate for passing a signal of one level and blocking the signal of the other level from the trigger circuit, (e) a power amplifier connected to the zener diode for receiving the passed signal therefrom to provide power to a stepper motor only when the passed signal is received, (f) conducting means connecting the converse output terminal of one trigger and the converse output terminal, via the inverter from the other trigger, to a control circuit which is connected to the stepper motor, for controlling the direction of rotation of the stepper motor in accordance with the received converse signals.

References Cited by the Examiner

UNITED STATES PATENTS

| 2,922,095 | 1/60 | Hesse et al. | 310—49 X |
| 2,994,813 | 8/61 | Towner et al. | 310—49 X |
| 3,024,399 | 3/62 | Valentino | 310—49 X |
| 3,117,268 | 1/64 | Madsen | 310—49 X |

ORIS L. RADER, *Primary Examiner.*